United States Patent
Hirmer

[19]

[11] Patent Number: 6,037,761
[45] Date of Patent: Mar. 14, 2000

[54] VOLTAGE SUPPLY CIRCUIT

[75] Inventor: Gerald Hirmer, Mantel, Germany

[73] Assignee: Siemens Aktiengesellschaft, Munich, Germany

[21] Appl. No.: 09/126,984

[22] Filed: Jul. 30, 1998

[30] Foreign Application Priority Data

Aug. 1, 1997 [DE] Germany .................. 297 13 777 U

[51] Int. Cl.[7] ...................................................... G05F 1/12
[52] U.S. Cl. .............................................. 323/299; 307/66
[58] Field of Search ............................... 323/299; 307/64, 307/65, 66

[56] References Cited

U.S. PATENT DOCUMENTS 5,739,596  4/1998  Takizawa et al. ..................... 307/66

OTHER PUBLICATIONS

Amphein et al., *Neue Kompakteräte runden SPS–Spektrum ab*, Engineering & Automation 13, 1991, H.2, S. 4–7 * no month ava.

*Primary Examiner*—Peter S. Wong
*Assistant Examiner*—Rajnikant B. Patel
*Attorney, Agent, or Firm*—Kenyon & Kenyon

[57] ABSTRACT

A voltage supply circuit for a CPU of a programmable controller is provided, the CPU receiving via the voltage supply circuit at least two supply voltages obtained from an input voltage. The circuit operates in a manner such that when the input voltage is increased from an open-circuit potential, a first supply voltage is received by the CPU as soon as the input voltage exceeds an upper input voltage threshold value. The second supply voltage is received by the CPU when the first supply voltage exceeds a primary supply voltage threshold value. When the input voltage decreases from a value (where both supply voltages are received by the CPU), the second supply voltage is no longer received by the CPU when the input voltage and drops below a lower input voltage threshold value, and also the first supply voltage is no longer received by the CPU as soon as the second supply voltage drops below a secondary supply voltage threshold value.

5 Claims, 2 Drawing Sheets

VOLTAGE SUPPLY CIRCUIT

FIELD OF THE INVENTION

The present invention relates to a voltage supply circuit for a central processing unit of a stored-program controller, the central processing unit receiving, via the voltage supply circuit, at least two supply voltages obtained from one input voltage.

BACKGROUND INFORMATION

Voltage supply circuits for CPUs of stored-program (programmable) controllers are generally known in the related art. Furthermore, voltage supply circuits providing a CPU with at least two supply voltages obtained from an input voltage of the voltage supply circuit are also known.

Voltage supply circuits that output several supply voltages must satisfy certain making conditions. The supply voltages have been set high and low simultaneously or with a time lag. The length of the voltage ramps depends on the load on the input voltage and the component leakage. Well-defined making conditions of the supply voltages delivered by the voltage supply circuit can, therefore, be implemented only with long delays and/or considerably complex circuits.

SUMMARY OF THE INVENTION

The object of the present invention is to provide a voltage supply circuit for a CPU of a stored-program controller where at least two supply voltages, obtained from an input voltage and satisfying certain predefined making conditions regarding the time sequence of switching each supply voltage to the CPU, can be supplied to the voltage supply circuit.

In accordance with an exemplary embodiment of the present invention, the circuit operates in a manner such that when the input voltage is increased from an open-circuit potential, the CPU receives the first supply voltage as soon as the input voltage exceeds an upper threshold value. Additionally, the CPU receives the second supply voltage as soon as the first supply voltage exceeds a primary supply voltage threshold value. Also, when the input voltage is reduced from an input voltage value at which both input voltages are received by the CPU, the second supply voltage is no longer received by the CPU as soon as the input voltage drops below a lower input voltage threshold value. Moreover, the first supply voltage is no longer received by the CPU as soon as the second supply voltage drops below a secondary supply voltage threshold value.

In accordance with the exemplary embodiment of the present invention, it is advantageously possible to supply the CPU of the stored-program controller with two supply voltages, the second supply voltage being switched on only when the first supply voltage exceeds a primary supply voltage threshold value.

In order to guarantee a stable ramping of the current supply, the first or second supply voltage may be switched on from an input voltage that is higher than the input voltage threshold value and, similarly, the first or second supply voltage may be switched off again at an input voltage that is lower than a lower input voltage threshold value.

The supply voltages are advantageously switched on and off depending on the voltage level either of the other supply voltage or of the input voltage. The voltages are switched on and off in the shortest possible time independently of the load, input voltage and component leakage.

DETAILED DESCRIPTION OF THE INVENTION

Figure 1:
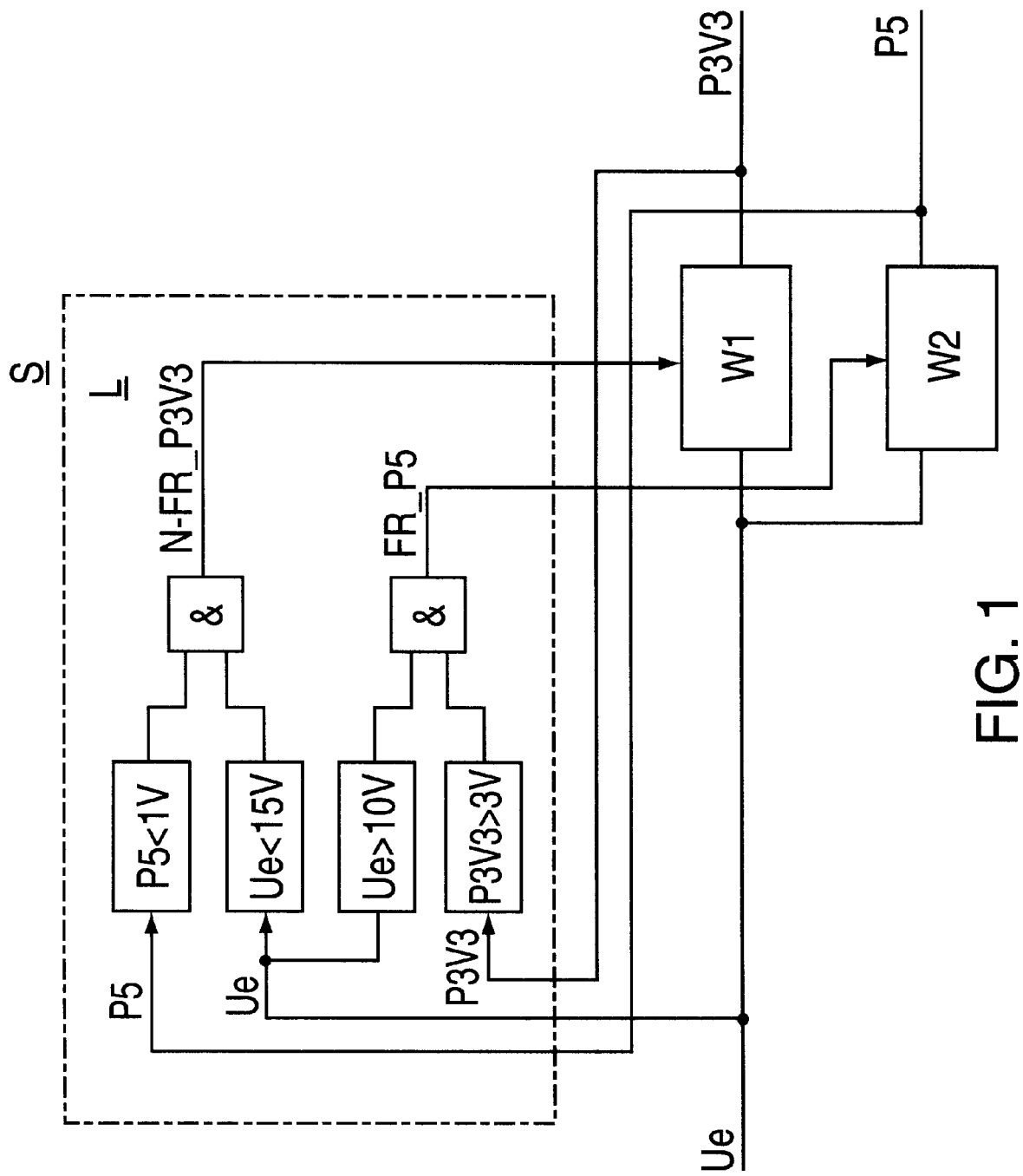
FIG. 1 illustrates a schematic of a voltage supply circuit in accordance with an exemplary embodiment of the present invention.

As illustrated in FIG. 1, voltage supply circuit S includes a first transformer W1 which generates the first supply voltage P3V3 from input voltage Ue. Voltage supply circuit S also includes a second transformer W2, which generates a second supply voltage P5 from input voltage Ue.

Transformers W1, W2 are activated by a starting logic L of voltage supply circuit S. The first supply voltage P3V3 is provided at the output of first transformer W1 only when transformer W1 is activated by starting logic L. Similarly, second supply voltage P5 is provided at the output of transformer W2 only when the second transformer W2 is activated by starting logic L.

The starting logic L includes two outputs N-FR$_{13}$ P3V3 and FR_P5 for activating the first transformer W1 and the second transformer W2, respectively (the prefix "N-" denoting inversion of the respective signal). The starting logic L receives input voltage Ue and supply voltages P3V3 and P5 as input values.

Within the starting logic L, voltages Ue, P3V3 and P5 are linked. Transformer W1 is activated via enable signal N-FR_P3V3 when, with the increase of input voltage Ue from an open-circuit potential, input voltage Ue exceeds an upper input voltage threshold value V15, in this case, 15 V.

Furthermore, transformer W2 is also activated by the starting logic L via activation signal FR_P5 when input voltage Ue increases from an open-circuit potential, as soon as the first supply voltage P3V3 exceeds a primary supply voltage threshold value V3, in this case, 3 V.

The open-circuit potential is, in the exemplary embodiment, a potential at which neither the first nor the second supply voltage P3V3, P5 is received by the CPU of the stored-program controller, i.e., the 0 V potential, for example.

Analogously to the switching in of the supply voltages when input voltage Ue increases, when input voltage Ue decreases (i.e., from a value of input voltage Ue, at which value both supply voltages P3V3, P5 are received by the central processing unit), starting logic L no longer generates activation signal FR_P5 for second transformer W2, thus deactivating this transformer W2 as soon as input voltage Ue falls below a low input-voltage threshold value V10, in this case 10 V. Additionally, starting logic L no longer generates activation signal N-FR_P3V3 for first transformer W1, thus deactivating the first transformer W1, as soon as second supply voltage P5 falls below a secondary supply-voltage threshold value V1, in this case 1V.

Figure 2:
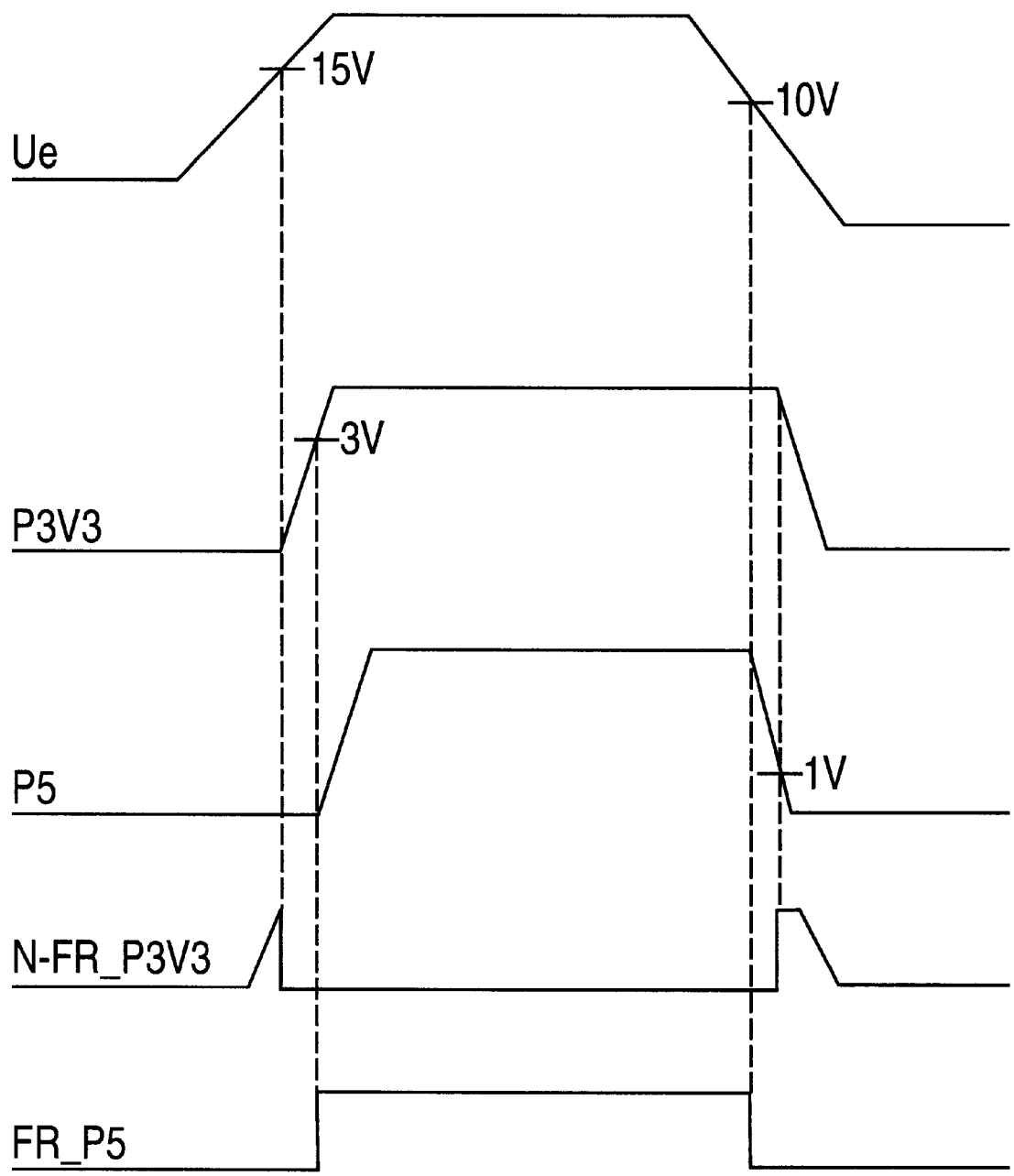
FIG. 2 illustrates a timing diagram in accordance with the exemplary embodiment of the present invention.

The variation over time of the two supply voltages P3V3, P5 in relation to input voltage Ue can be seen in FIG. 2. Some aspects of the operation of the voltage supply circuit according to the present invention are further described below.

Clocked current supplies have a higher current consumption in the case of a small input voltage than at nominal voltage. This fact often results in either the input fuse being tripped or the current limiter of the supply responding. Therefore, when switched on, signal N-FR_P3V3 goes low starting at an input voltage threshold value V15. As a result, the current supply starts only when this voltage is reached, preventing excessive current consumption in the case of a low voltage.

First supply voltage P3V3 must be present as soon as second supply voltage P5 is available, but it should not remain by itself for a longer period. At switch-off, signal N-FR_P3V3 goes high when the second supply voltage P5 drops below the secondary supply voltage threshold value V1. This results in the first supply voltage P3V3 being switched off immediately after the drop in the second supply voltage P5.

FIG. 2 also shows that the voltages cannot increase at an infinite rate at switch-on, but need a certain time for ramp-up.

The use of the voltage supply circuit according to the present invention is not limited to CPUs of stored-program controllers, but can also be used in electrical devices of any type requiring two different supply voltages, whose making conditions must satisfy certain timing criteria.

In particular, the principle of the voltage supply circuit according to the present invention can also be extended to voltage supply circuits for outputting more than two supply voltages, e.g., a first, a second, and an nth supply voltage; in this case, when the input voltage increases, the mth supply voltage (2<m<n) is received by the CPU as soon as the (m−1)th supply voltage has exceeded a certain threshold value, and similarly when the input voltage is reduced, the (m−1)th first supply voltage (2<m<n) is no longer received by the CPU, as soon as the mth supply voltage drops below a certain threshold value.

What is claimed is:

1. A circuit arrangement for supplying at least two supply voltages to a central processing unit of a programmable controller, the at least two supply voltages including a first supply voltage and a second supply voltage, comprising:

a voltage supply circuit for receiving an input voltage and for supplying to the central processing unit the first supply voltage when the input voltage is increased from an open circuit potential and the input voltage exceeds an upper input voltage threshold value, the voltage supply circuit further supplying to the central processing unit simultaneously both the first supply voltage and the second supply voltage when the input voltage is increased from the open circuit potential and the first supply voltage exceeds a primary supply voltage threshold value;

wherein when the supply circuit supplies to the central processing unit simultaneously both the first supply voltage and the second supply voltage, and the input voltage is decreased below a lower input voltage threshold value, the voltage supply circuit discontinues supplying to the central processing unit the second supply voltage, and when the second supply voltage falls below a secondary supply voltage threshold value, the voltage supply circuit discontinues supplying to the central processing unit the first supply voltage.

2. A circuit arrangement for a central processing unit of a programmable controller, comprising:

a voltage supply generating a first supply voltage and a second supply voltage; and a voltage supply circuit coupled to the voltage supply for receiving an input voltage and for providing to the central processing unit the first supply voltage when the input voltage is increased from an open circuit potential and the input voltage exceeds an upper input voltage threshold value, the voltage supply circuit further providing to the central processing unit simultaneously both the first supply voltage and the second supply voltage when the input voltage is increased from the open circuit potential and the first supply voltage exceeds a primary supply voltage threshold value;

wherein when the voltage supply circuit provides to the central processing unit simultaneously both the first supply voltage and the second supply voltage, and the input voltage is decreased below a lower input voltage threshold value, the voltage supply circuit discontinues providing to the central processing unit the second supply voltage, and when the second supply voltage falls below a secondary supply voltage threshold value, the voltage supply circuit discontinues providing to the central processing unit the first supply voltage.

3. The circuit arrangement according to claim 2, wherein the voltage supply includes a first transformer for generating the first supply voltage, and a second transformer for generating the second supply voltage.

4. The circuit arrangement according to claim 2, wherein the voltage supply receives the input voltage and generates at least one of the first supply voltage and the second supply voltage as a function of the input voltage.

5. The circuit arrangement according to claim 2, wherein the voltage supply circuit provides to the central processing unit at least one of the first supply voltage and the second supply voltage by controlling the voltage supply to provide to the central processing unit the at least one of the first supply voltage and the second supply voltage.

* * * * *